(12) United States Patent
Searles et al.

(10) Patent No.: US 7,561,625 B1
(45) Date of Patent: Jul. 14, 2009

(54) METHOD AND APPARATUS FOR CROSSTALK REDUCTION

(75) Inventors: Shawn Searles, Austin, TX (US); Gerald R. Talbot, Concord, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 600 days.

(21) Appl. No.: 11/348,136

(22) Filed: Feb. 6, 2006

(51) Int. Cl.
*H04B 3/00* (2006.01)

(52) U.S. Cl. ..................................... 375/257

(58) Field of Classification Search .............. 375/220, 375/257, 367, 377; 327/141
See application file for complete search history.

(56) References Cited

U.S. PATENT DOCUMENTS

| | | | |
|---|---|---|---|
| 5,774,001 A * | 6/1998 | Mozdzen et al. ............ | 327/141 |
| 6,628,605 B1 * | 9/2003 | Chang ........................ | 370/208 |
| 7,123,660 B2 * | 10/2006 | Haq et al. ................... | 375/257 |
| 7,266,257 B1 | 9/2007 | Chowdhury et al. | |
| 7,274,746 B2 | 9/2007 | Bailey | |
| 7,275,193 B1 | 9/2007 | Verma | |
| 7,280,953 B2 | 10/2007 | Fujimori | |
| 2004/0068759 A1 * | 4/2004 | Sheehy et al. ............... | 725/147 |
| 2005/0208838 A1 * | 9/2005 | Horowitz et al. ............ | 439/676 |

* cited by examiner

*Primary Examiner*—Khanh C Tran
(74) *Attorney, Agent, or Firm*—Meyertons Hood Kivlin Kowert & Goetzel, P.C.; Erik A. Heter

(57) ABSTRACT

A method and apparatus for crosstalk reduction. In one embodiment, an electronic system includes a transmitter and a receiver coupled by a plurality of differential signal paths. A first differential signal path is adjacent to a second differential signal path, which is adjacent to a third. Data transmitted on a first differential signal path is scrambled with a first scrambler function, while data transmitted on a third differential signal path is scrambled with a second scrambler function, which is an inverse of the first scrambler function. Data transmitted on a second differential signal path is scrambled with a third scrambler function, while data transmitted on a fourth differential signal path is scrambled with a fourth scrambler function that is an inverse of the third.

24 Claims, 5 Drawing Sheets

METHOD AND APPARATUS FOR CROSSTALK REDUCTION

BACKGROUND OF THE INVENTION

1. Field of the Invention

This invention relates to electronic systems, and more particularly, to the reduction of cross-talk between signal lines in electronic systems.

2. Description of the Related Art

One important consideration in the design of electronic systems is the affect of noise on the various signal paths. Noise in an electronic system may be defined by the deviation of a signal from its intended or ideal value. Such deviations may be caused by a number of factors, such as power supply bounce due to simultaneous switching, cross talk between signal lines, and electromagnetic energy produced by other sources. Designing a properly functioning electronic system requires that the effects of the various types of noise be reduced to the maximum extent possible.

One signaling convention that is useful in reducing noise from cross talk or electromagnetic energy from other sources is that of differential signaling. Differential signaling is well known in the art, and involves two signal lines that convey complementary states (with respect to each other) of the same signal. Since the two signal lines that convey a differential signal are typically in close physical proximity to each other, noise in the vicinity tends to effect both of them equally, the overall effect of the noise tends to be cancelled out.

Problems may arise when a number of differential signal lines are placed within close physical proximity of each other. For example, crosstalk can occur between two differential signal lines that are not part of the same differential pair but are nevertheless adjacent to each other. When this occurs, it is possible that the differential signal lines of their respective pairs may not be affected equally. Thus, such noise may adversely affect differential signals and may lead to erroneous operation of the electronic system.

SUMMARY OF THE INVENTION

A method and apparatus for crosstalk reduction is disclosed. In one embodiment, an electronic system includes a transmitter and a receiver coupled by a plurality of differential signal paths. A first differential signal path is adjacent to a second differential signal path, which is adjacent to a third. Data transmitted on a first differential signal path is scrambled with a first scrambler function, while data transmitted on a third differential signal path is scrambled with a second scrambler function, which is an inverse of the first scrambler function. Data transmitted on a second differential signal path is scrambled with a third scrambler function, while data transmitted on a fourth differential signal path is scrambled with a fourth scrambler function that is an inverse of the third.

In one embodiment, scrambling and descrambling may be performed using filters. The filter functions act as a scrambler function that scrambles the data. In particular, data transmitted on a given differential signal path may be scrambled by a first filter having a first filter function and may be descrambled a second filter having a second filter function that is an inverse of the first filter function. Furthermore, the filter functions of the first and third differential signal paths (or similar pairs of differential signal paths) may be configured as to produce outputs that are inverses of each other so that both signal lines of the differential signal path between them are affected equally by any crosstalk noise. Embodiments employing filters for scrambling and descrambling may be self-synchronizing; that is, no synchronization is required with a clock signal.

In another embodiment, scrambling and descrambling may be performed by exclusive OR-ing transmitted data with values generated by a sequence generator. The sequence generator may be included in the transmitter, and may generate a sequence of logical values. A first scrambler function is provided by taking each logical value directly from the sequence generator, while a second scrambler function is provided by inverting the output from the sequence generator. On the transmitter side, each data value transmitted on the first differential signal path is scrambled by exclusive OR-ing it with a logical value provided by the sequence generator, while each data value transmitted on the third differential signal path is scrambled with the inverse of the logical value provided by the sequence generator. The original data transmitted on each of the differential signal paths may be recovered at the receiver by exclusive OR-ing it with the same logical value is was scrambled with in the transmitter.

In general, a pattern of scrambling outputs may be applied to a number of differential signal paths. For example, first and fifth differential signal paths may be scrambled with a first scrambler function, third and seventh differential signal paths may be scrambled with a second scrambler function, second and sixth differential signal paths may be scrambled with a third scrambler function, and fourth and eighth differential signal paths may be scrambled with a fourth scrambler function. The first and second scramblers outputs are inverses of each other, as are the third and fourth scrambler functions. Using this pattern, the transmission of various data sequences may result in substantially equal crosstalk noise being imparted on each signal line of a given differential signal path, resulting in common mode rejection of the noise.

BRIEF DESCRIPTION OF THE DRAWINGS

Other aspects of the invention will become apparent upon reading the following detailed description and upon reference to the accompanying drawings in which.

Figure 1:
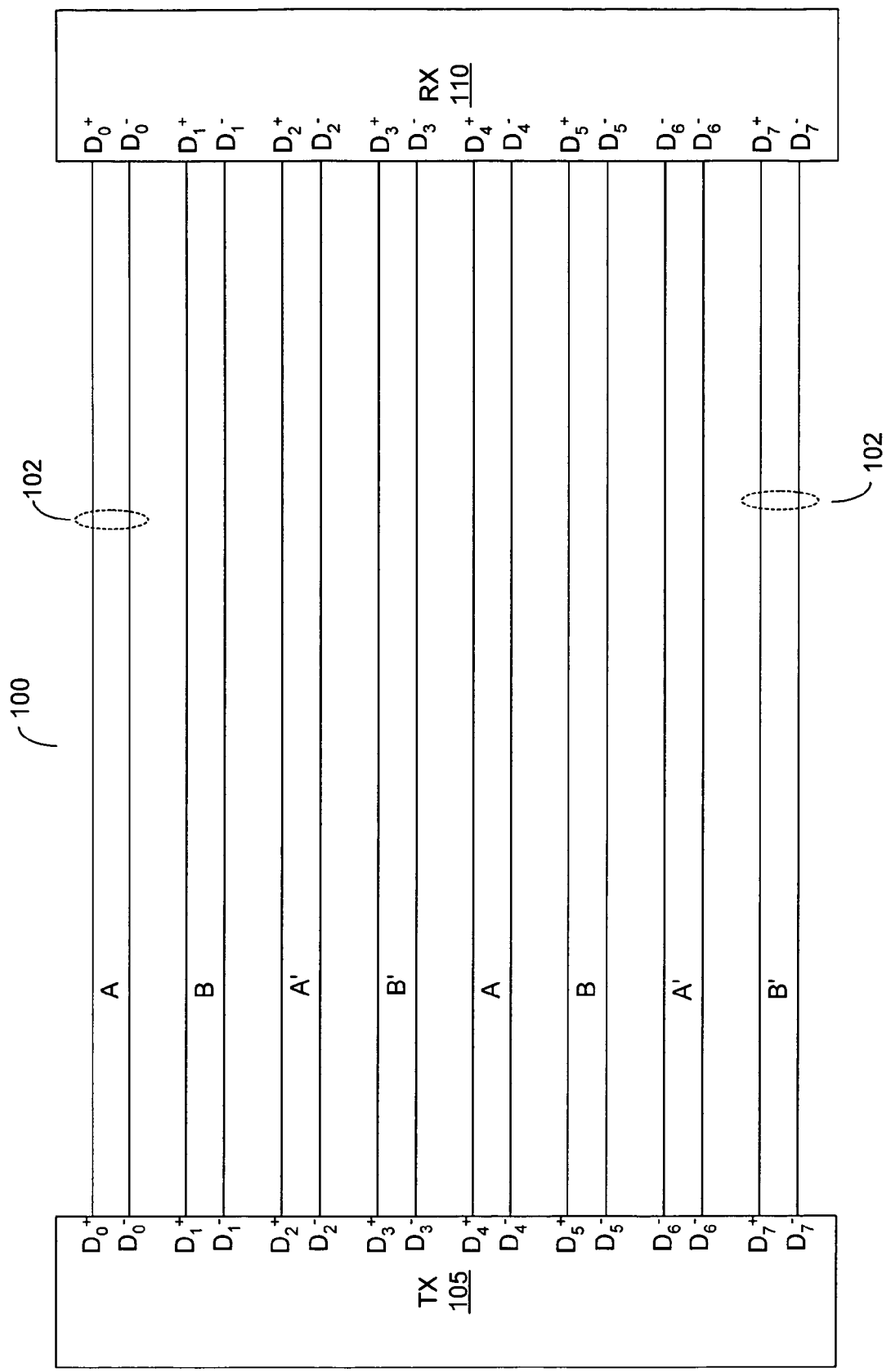
FIG. 1 is a block diagram of one embodiment of a communications link in an electronic system using differential signaling to convey information.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Turning now to FIG. 1, a block diagram of one embodiment of a communications link in an electronic system using differential signaling to convey information is shown. In the embodiment shown, communications link 100 includes a transmitter 105 and a receiver 110. Transmitter 105 and receiver 110 are coupled to each other by a plurality of differential signal paths 102. As is well known to those skilled in the art, each differential signal path includes two signal lines, and during any given transmission, and that a differential signal transmission involves the transmission of a signal on each of the signal lines of a given differential pair, wherein these signals are complements of each other.

In the embodiment shown, differential signals conveyed between transmitter 105 and receiver 110 are scrambled prior to transmission. Each of the differential signal paths 102 shown in FIG. 1 is labeled with a letter representing a scrambler function (i.e. a scrambler pattern or function used to scramble the data) with which data transmitted on the signal path is scrambled. For example, the first differential signal path (labeled $D_0^+$ and $D_0^-$) is scrambled with scrambler function A, the second differential signal path is scrambled with scrambler function B, the third differential signal path is scrambled with scrambler function A', and the fourth differential signal path is scrambled with scrambler function B'. This pattern is repeated for the fifth through eighth differential signal paths, and may be repeated for larger numbers of differential signal paths (e.g., 16, 32, etc.). Partial portions of the pattern may be repeated for certain numbers of differential signal paths as well, i.e. if there are 10 differential signal paths, the last two may be scrambled by scrambler functions A and B.

It should be noted, in accordance with standard differential signaling practice, that each signal line $D_x^-$ carries a signal value that is the inverse of the signal line $D_x^+$.

Scrambler functions A and A' are inverses of each other, as are scrambler functions B and B'. In one embodiment, A and A' (as well as B and B') may represent filter functions, wherein the filter functions are inverses of each other. For example, the filter functions of A and A' may be defined by transfer functions, wherein the poles of the function represented by A are the zeros of the function represented by A', and vice versa.

In another embodiment, the scrambler functions may be implemented using logic circuits. For example, a pseudorandom sequence generator may be used to generate a sequence of logic values (i.e. 1's and 0's) which may be exclusive OR-ed with the data values to be transmitted. In addition to providing a sequence of logical values, the sequence generator may also provide the complement of the logical values. Thus in this example, the scrambler function of A may be implemented on the first differential signal path by exclusive OR-ing the transmitted data the output of the sequence generator. The scrambler function of A' is implemented on the third differential signal path by exclusive OR-ing the transmitted data with the complementary output provided by the sequence generator. The scrambler functions of B and B' may also be implemented in this manner. Additional detail of various methods of implementing scrambler functions will be discussed below.

The pattern (i.e. A, B, A', B', etc.) used for implementing scrambler functions across a number of differential signal paths may aid in the reduction of crosstalk noise. In particular, when a first an a third differential signal path are both adjacent to a second differential signal path, scrambling data transmitted on the first differential signal path with a first function and data transmitted on the third differential signal path with an inverse of the first function may result in both signal lines of the second differential signal path being affected in a substantially equal manner. This may be particularly true for crosstalk noise generated by the transmission of data across the differential signal paths.

Figure 2:
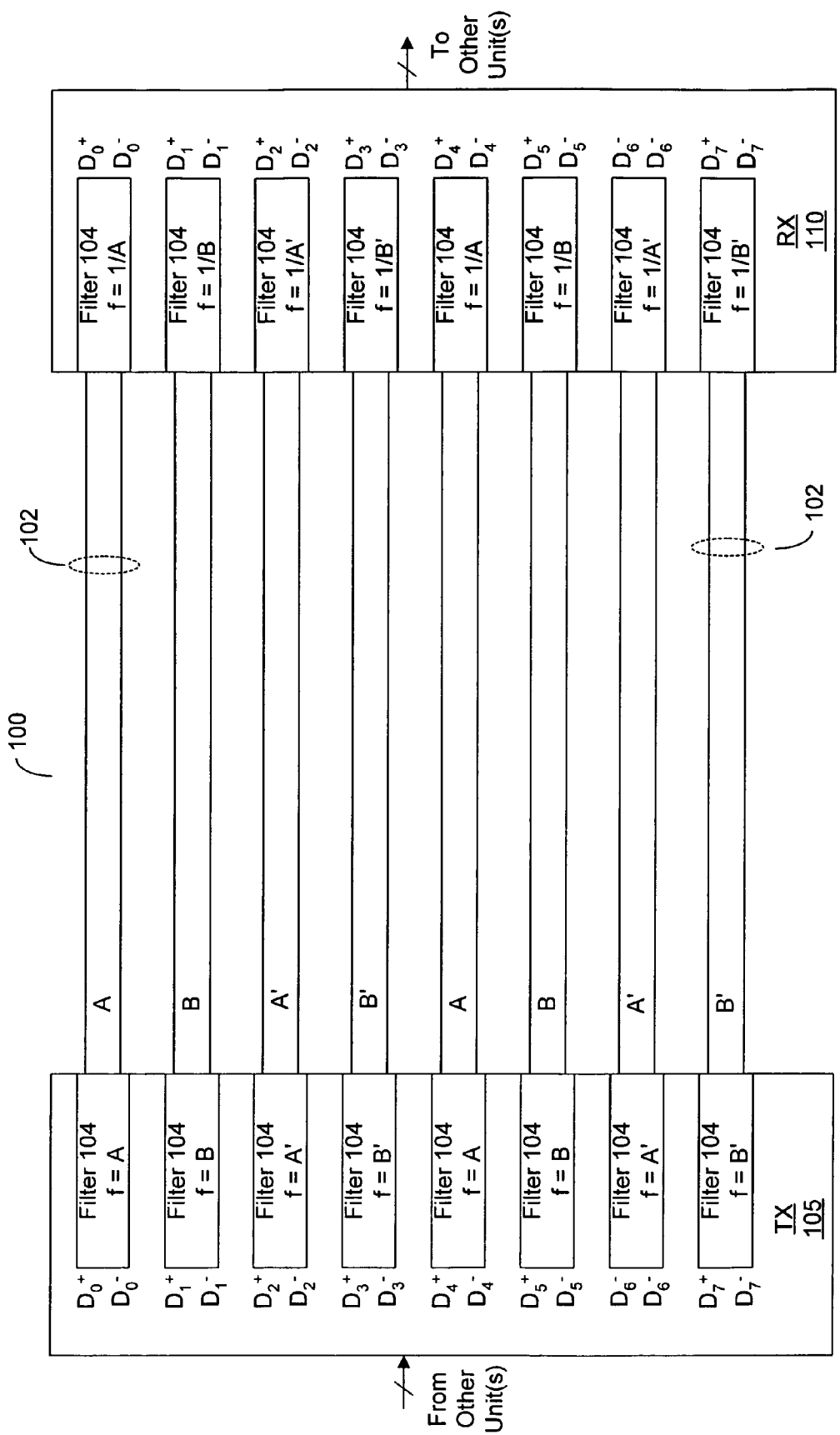
FIG. 2 is a block diagram of one embodiment of an electronic system using filters and inverse filters for scrambling and descrambling, respectively.

Moving now to FIG. 2, a block diagram of one embodiment of an electronic system using filters and inverse filters for scrambling and descrambling, respectively. The patterns used to scramble data across the plurality of differential signal paths 102 (i.e. A, B, A', B', etc.) is the same here as the embodiment shown in FIG. 2. In the embodiment shown, transmitter 105 includes a filter 104 for each of the differential signal paths 102. Each filter 104 may apply a function filter function to the data to be transmitted over its respective differential signal path. Receiver 110 also includes a plurality of filters each associated with a differential signal path 102. Each filter in receiver 110 has a filter function that is an inverse of the filter function in its associated transmitter. For example, signals transmitted on the top ($D_0$ as shown in the drawing) differential signal path 102 are scrambled by being passed through a filter having a filter function A upon transmission, and are descrambled by being passed through a filter having a filter function 1/A upon reception by receiver 110. Similarly, signals transmitted over the next differential signal line 102 are scrambled by being passed through a filter having filter function B upon transmission and descrambled by being passed through a filter having a filter function 1/B.

Embodiments using filters may be self-synchronizing, as no protocol for synchronization is required to be provided to the filters in order to function correctly. In the case of non-self-synchronizing embodiments, an external synchronization path as shown in FIG. 3A may be provided, or a training sequence may be inserted into the transmitted data that uniquely identifies the position of the sequence.

As previously noted, the filter functions A and 1/A are inverses of each other. It should be noted that A' and 1/A are not necessarily the same function, although they may be in some embodiments. This also applies to filter functions labeled B, B', and 1/B. In general, each filter function may be expressed as a transfer function, such as $$h(s) = \frac{(s+2)}{(s+3)(s+6)}.$$

In the transfer function shown, h(s) has poles at −3 and 4 and has a zero at −2. Thus, an inverse of the transfer function shown above would be the reciprocal of the function shown above, and would have zeros at −3 and 4 and a single pole at −2. Data scrambled by a filter having the transfer function shown above may be descrambled by applying the scrambled data to a filter having the inverse (i.e. reciprocal) transfer function.

It should be noted that the transfer function discussed above is exemplary and is not explicitly intended to represent any specific filter function used in this embodiment. The actual filter functions used in a specific embodiment may be chosen by the designer to best fit the particular application. It is further noted that filter functions may be expressed in forms other than the one shown above, including in different domains (e.g., in the z-domain as is commonly used for expressing transfer functions in digital filter designs).

Various types of filters may be used to scramble/descramble data transmitted over differential signal paths 102. Such filters may be digital or analog (which may require conversion of the signals to an analog format). Digital filters may include such FIR (finite impulse response) filters or IIR (infinite impulse response) filters. In general, any type of filters that allow for the scrambling of data and recovery of the scrambled data may be used.

Turning now to FIG. 3A, a block diagram of one embodiment of an electronic system using a sequence generator for scrambling information transmitted on the differential signal lines is shown. In this embodiment, data transmitted over the differential signal paths 102 of communications link 100 is scrambled using sequence generators. Sequence generator A 107 produces a sequence A, while sequence generator B 109 produces a sequence B. Each sequence is a stream of data values, i.e. logical 0's and 1's. Sequences A and B may each have different generating functions or could come from the same generating function started with different seeds.

Both transmitter 105 and receiver 110 are coupled to receive a synchronization signal (via the line in the drawing designated 'sync'). The 'sync' signal is used to synchronize both the data to be transmitted as well as the outputs of the sequence generators 107 and 109 (A and B, respectively). Thus, the transmission, reception, scrambling and descrambling of data are synchronized by the 'sync' signal In the embodiment shown, receiver 110 includes a synchronization unit 113 (shown here in two separate units, one each for sequence A and sequence B). During a preamble time when communications between transmitter 105 and receiver 110 are being established, the sequence generators of transmitter 105 may transmit a pattern to the synchronization circuit 113. In response to receiving the pattern, synchronization circuit 113 may set both sequence generator A 107 and sequence generator B 109 to a predetermined state. The state to which the sequence generators are set may ensure that the sequence generators of both the transmitter and receiver are synchronized. In alternative embodiments, an output from each of the sequence generators in transmitter 105 may be provided to receiver circuit 110 directly.

Inverters coupled to the output lines of sequence generators 107 and 109 allow the generation A' and B' sequences, respectively. Each data value of the A' and B' sequences is, respectively, the logical complement of a corresponding data value of the A and B sequences in this embodiment. In one embodiment, the sequence generators produce a pseudo-random sequence. Embodiments using sequence generators that produce other types of sequences are possible and contemplated.

In the embodiment of FIG. 3A, transmitter 105 includes a plurality of exclusive OR (XOR) gates, one for each physical signal line. The data to be transmitted over each differential signal path 102 is scrambled by exclusive-OR'ing it with the output of one of the sequence generators. For example, the data transmitted over the signal lines of differential signal path $D_0$ (both $D_0^+$ and $D_0^-$) is exclusive-OR'ed with data from sequence A, the data transmitted over the signal lines of $D_1$ is exclusive-OR'ed with sequence B, the data transmitted over the signal lines of $D_2$ is exclusive OR'ed with A', and so on. Thus, the A, B, A', B' pattern discussed above is maintained in this embodiment as well.

Receiver 110 also includes a plurality of exclusive OR gates for descrambling the received data (via receivers 129). Additionally, receiver 110 is coupled to receive the sequences provided by sequence generators 107 and 109, and also includes inverters in order to provide the complementary sequences. Descrambling is accomplished by exclusive-OR'ing the scrambled data transmitted across each of differential signal paths 102 with the same data that it was scrambled with in transmitter 105. For example, each data bit transmitted across differential signal line $D_0$ is scrambled with a value generated by sequence generator A and is descrambled with the same value in receiver 110. Since $$(D_0 \text{XOR} A) \text{XOR} A = D_0,$$

the original value of $D_0$ is recovered by exclusive-OR'ing the scrambled data with the same value with which $D_0$ was scrambled with in transmitter 105. This same technique is used to recover the original data values (i.e. prior to scrambling) transmitted over each of the differential signal paths.

In addition to the signal paths for the signals to be conveyed between transmitter 105 and receiver 110, some embodiments may include dummy signal paths 117 and 119, which are shown here as dashed lines. The dummy signal paths may duplicate the transmission of data transmitted over certain other signal paths in order to provide greater noise immunity to the differential signal paths on the ends (i.e. $D_0$ and $D_7$ in the embodiment shown). For example, the same data transmitted on $D_3$ (and scrambled with pattern B') may be also transmitted on dummy signal path 117 to provide additional common mode noise rejection to signal path $D_0$. Similarly, the same data transmitted on $D_0$ or $D_4$ (and scrambled with pattern A) may be transmitted on dummy signal path 119, providing additional common mode noise rejection to signal path $D_7$. The option of employing dummy signal paths as discussed herein may be used in embodiments where power requirements and board area permit their use.

Figure 3B:
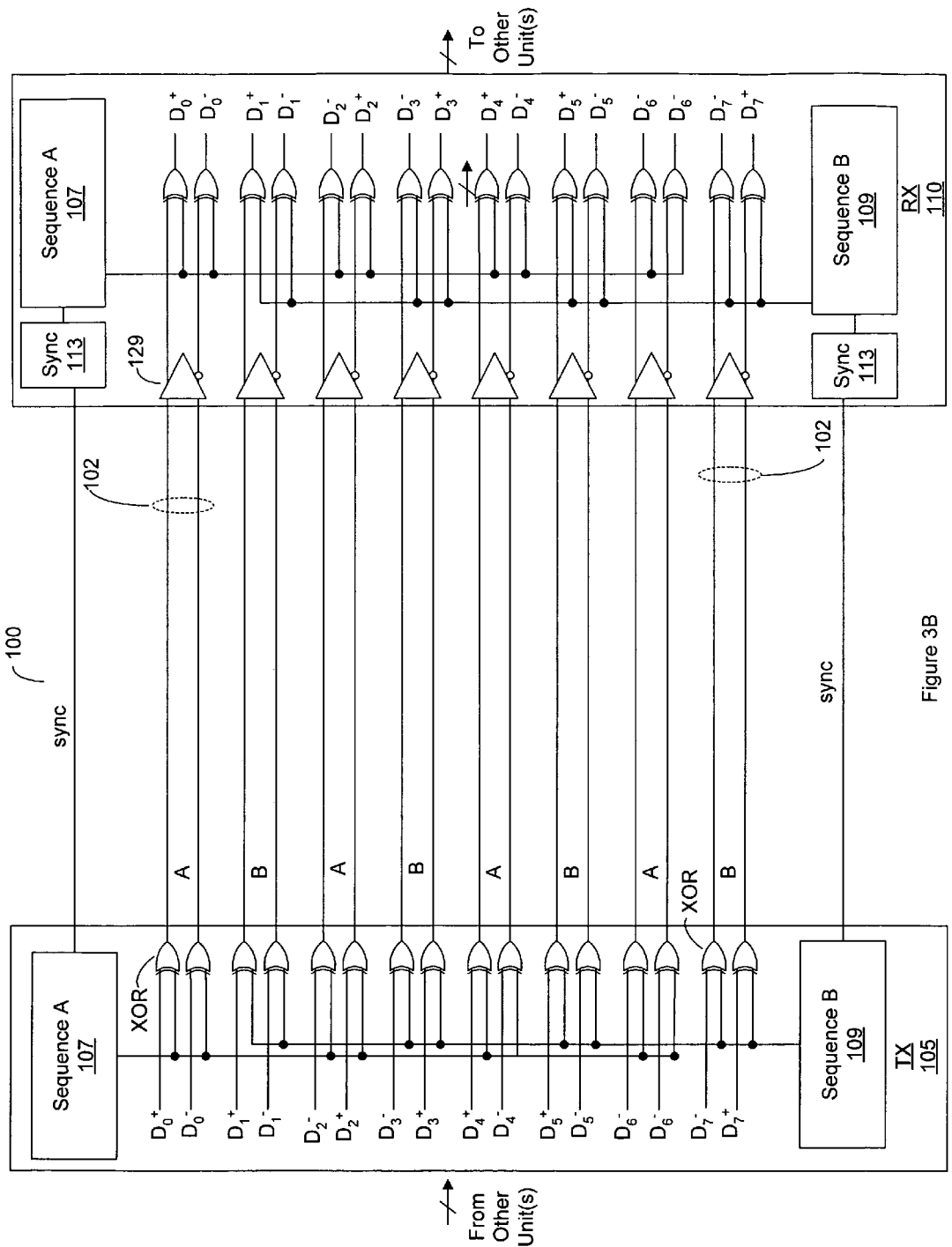
FIG. 3B is a block diagram of an alternate embodiment of an electronic system using a sequence generator for scrambling information transmitted on the differential signal lines.
Figure 3A:
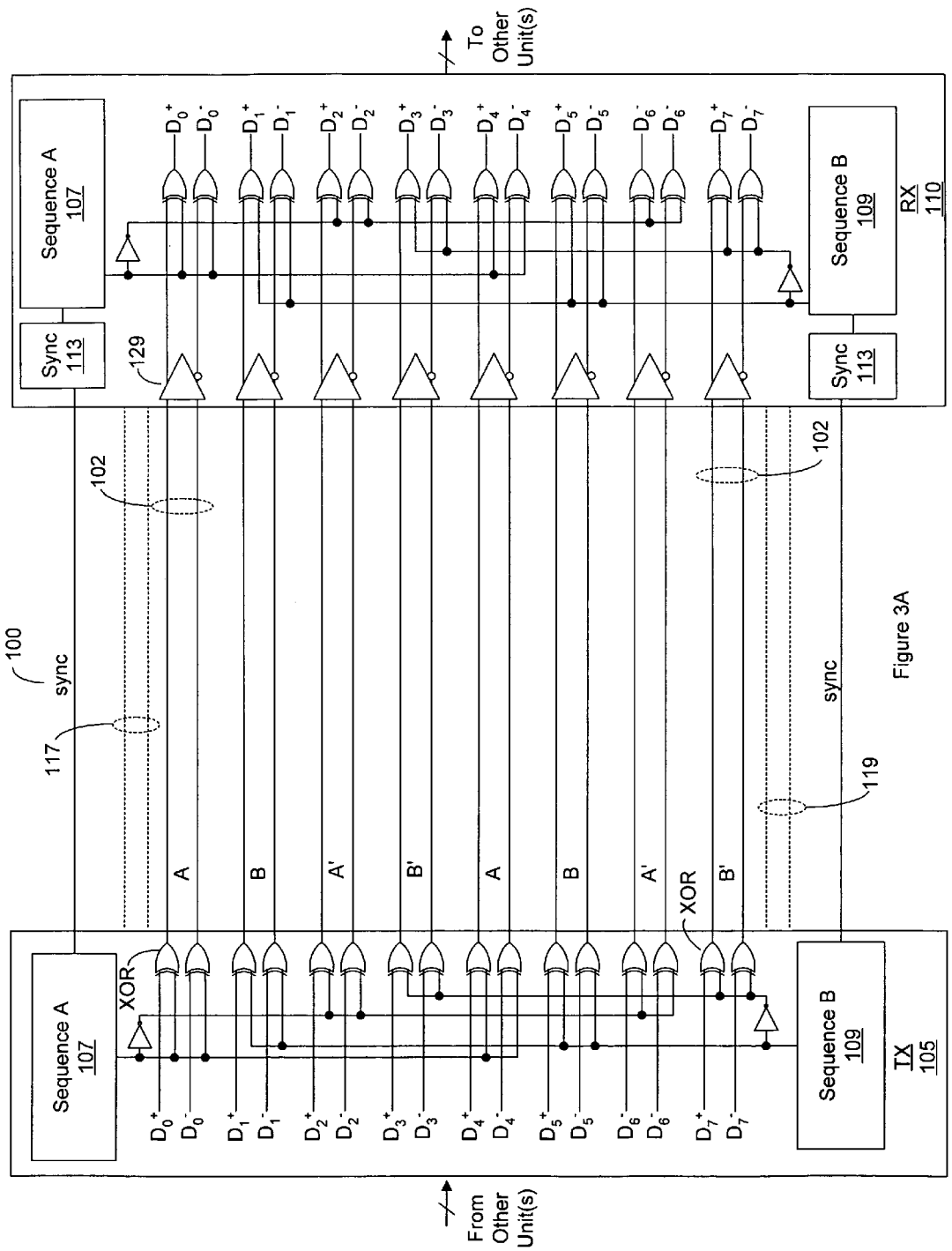
FIG. 3A is a block diagram of one embodiment of an electronic system using a sequence generator for scrambling information transmitted on the differential signal lines.

FIG. 3B is a block diagram of an alternate embodiment of an electronic system using a sequence generator for scrambling information transmitted on the differential signal lines. In contrast to the embodiment illustrated in FIG. 3A, no inverse patterns (e.g., A', B') are used. Instead, the polarity of each of the differential signals is reversed for those signals that are equivalent to those that would otherwise be scrambled with an inverse pattern. This in effect accomplishes the same effect as the use of inverse patterns. The polarities for each of the differential signals may be reversed either by swapping the respective locations of the signal lines or by inverting the signals to scrambling. In the embodiment shown, it is assumed that the signals arrive at transmitter 105 and leave receiver 110 with reversed polarities. However, embodiments are possible and contemplated wherein transmitter 105, receiver 110, or both include inverters for reversing the polarity of the differential signals as necessary.

While the embodiments shown above in FIGS. 2, 3A, and 3B each include a transmitter 105 and receiver 110, other embodiments where both the transmitter and receiver are replaced by transceivers (thereby allowing bi-directional signaling) are possible and contemplated.

Figure 4:
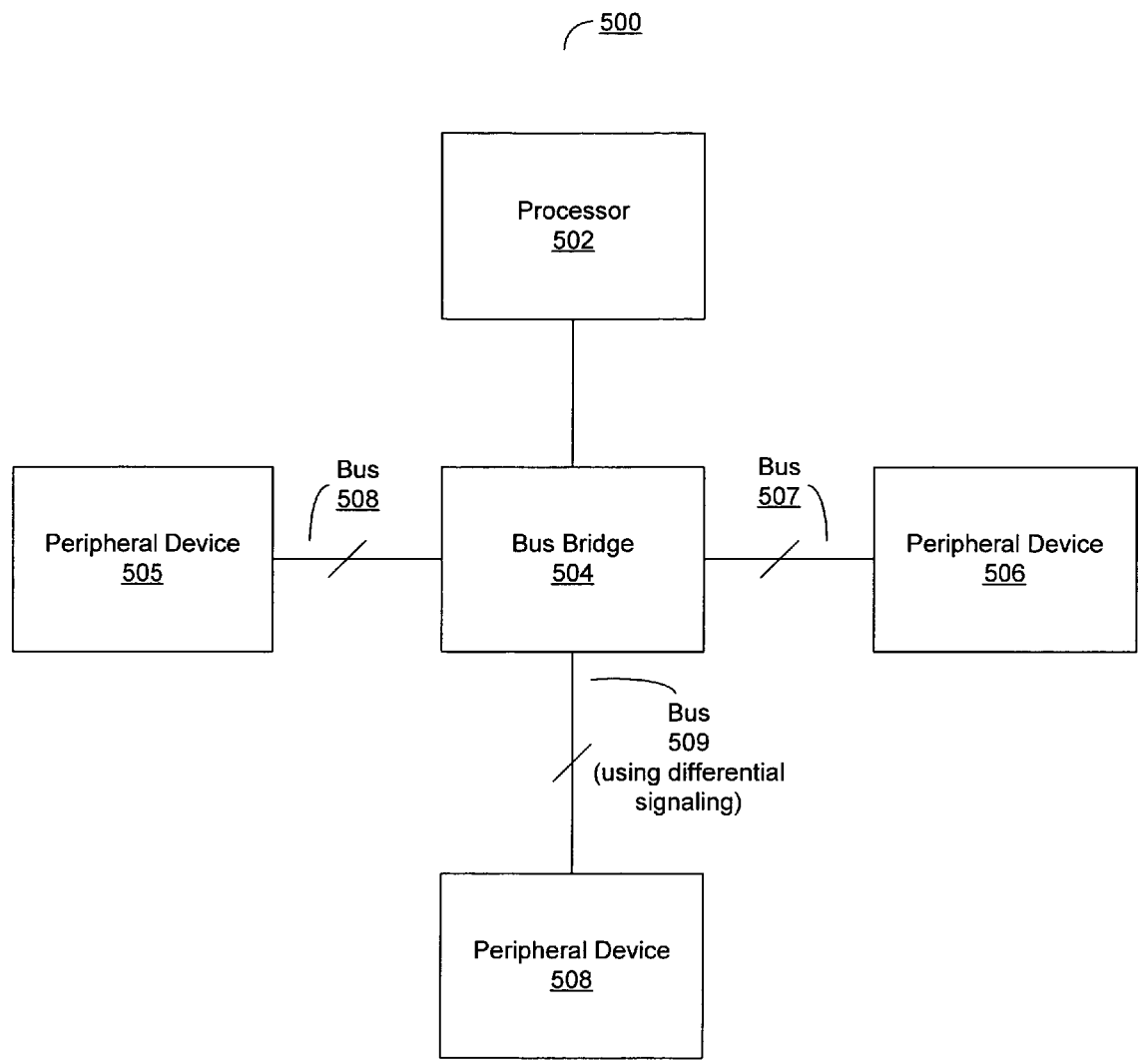
FIG. 4 is a block diagram of one embodiment of an exemplary computer system in which various embodiments of the communications link of FIG. 1 may be implemented.

Moving now to FIG. 4, a block diagram of one embodiment of a computer system is shown. In the embodiment shown, computer system 500 includes processor 502, which is coupled to bus bridge 504. Bus bridge 504 is also coupled to peripheral devices 506, 506, and 508 by buses 503, 507, and 509, respectively. Each bus may include a plurality of communications links for transmitting data between bus bridge 504 and its respective peripheral device. It should be noted that multiple peripheral devices may be coupled to any of the buses shown here. For the sake of simplicity in this particular drawing, only a single peripheral device is shown coupled to each bus. The buses shown here may operate using various well-known bus protocols, such as the peripheral component interconnect (PCI) or the advanced graphics port (AGP) protocols, or future bus protocols. The exact topography of the buses may be different than that shown here, as may be necessary. Each of the peripheral devices may be virtually any type of peripheral device, such as a printer, a scanner, a network interface card, and so forth.

Peripheral bus 509, in this embodiment, uses differential signaling. More particularly, peripheral bus 509 may employ one or more communications links that operate on the principle of those shown in FIGS. 2 and 3 with regard to the scrambling and descrambling of data. This may include the scrambling pattern of A B A' B' across a plurality of differential signal paths. The communications links may include transmitter-receiver links as shown in FIGS. 2 and 3, or may include transceivers in lieu of the transmitters and receivers for bi-directional links. Bus 509 may operate using any protocol that uses differential signaling, such as the HyperTransport™ protocol. As such, the particular topography of bus 509 may conform with its protocol, and thus multiple communications links and peripheral devices may be present. The particular arrangement shown in this drawing includes only one peripheral device for the sake of simplicity.

In addition to computer systems such as that discussed above, the method and apparatus described herein may be utilized in virtually any type of electronic system having communications links that use differential signaling.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method comprising:
transmitting data from a transmitter to a receiver in an electronic system via a plurality of differential signal paths, the plurality of differential signal paths including first, second, and third differential signal paths, wherein the first differential signal path is adjacent to the second differential signal path, and wherein the second differential signal path is adjacent to the third differential signal path;
scrambling the data transmitted on the first differential signal path using a first scrambler function of a scrambler circuit; and
scrambling the data transmitted on the third differential signal path using a second scrambler function of the scrambler circuit, wherein the second scrambler function is an inverse of the first scrambler function.

2. The method as recited in claim 1 further comprising:
transmitting data on a fourth one of the plurality of differential signal paths;
scrambling data transmitted on the second differential signal path with a third scrambler function; and
scrambling data transmitted on the fourth differential signal path with a fourth scrambler function, wherein the fourth scrambler function is an inverse of an the third scrambler function.

3. The method as recited in claim 2 further comprising:
transmitting data on a fifth and sixth ones of the plurality of differential signal paths;
scrambling data transmitted on the fifth differential signal path with the first scrambler function; and
scrambling data transmitted on the sixth differential signal path with the third scrambler function.

4. The method as recited in claim 2 further comprising:
receiving the data transmitted on each the plurality of differential signal paths; and
descrambling the data transmitted on each of the plurality of differential signal paths.

5. The method as recited in claim 4, wherein:
scrambling the data transmitted on the first differential signal path includes applying a first filter function;
scrambling the data transmitted on the third differential signal path includes applying a second filter function.

6. The method as recited in claim 5, wherein:
descrambling the data transmitted on the first differential signal path includes applying a third filter function, wherein the third filter function is an inverse of the first filter function; and
descrambling the data transmitted on the third differential signal path includes applying a fourth filter function, wherein the fourth filter function is an inverse of the second filter function.

7. The method as recited in claim 6, wherein said scrambling and said descrambling are self-synchronizing.

8. The method as recited in claim 4, wherein:
scrambling data transmitted on the first differential signal path includes exclusive OR-ing the data with a first sequence; and
scrambling data transmitted on the third differential signal path includes exclusive OR-ing the data with a second sequence, wherein the second sequence is the logical inverse of the first sequence.

9. The method as recited in claim 8, wherein:
descrambling data transmitted on the first differential signal path includes exclusive OR-ing the data with the first sequence; and
descrambling data transmitted on the third differential signal path includes exclusive OR-ing the data with the second sequence.

10. The method as recited in claim 9, wherein said scrambling and said descrambling are synchronized to a synchronization signal, wherein the transmitted data is also synchronized to the synchronization signal.

11. An electronic system comprising:
a plurality of differential signal paths, including first, second, and third differential signal paths, wherein the first differential signal path is adjacent to the second differential signal path, and wherein the second differential signal path is adjacent to the third differential signal path; and
a transmitter coupled to transmit data over the plurality of differential signal paths, wherein the transmitter includes circuitry configured to generate first and second scrambler functions, wherein data transmitted on the first differential signal path is scrambled with the first scrambler function, and wherein data transmitted on the third differential signal path is scrambled with the second scrambler function, wherein the second scrambler function is an inverse of the first scrambler function.

12. The system as recited in claim 11, wherein the transmitter further includes circuitry configured to generate third and fourth scrambler functions, wherein data transmitted on the second differential signal path is scrambled with the third scrambler function and wherein data transmitted on the fourth differential signal path is scrambled with the fourth scrambler function, wherein the fourth scrambler function is an inverse of the third scrambler function.

13. The system as recited in claim 12, wherein the plurality of differential signal paths includes fifth and sixth differential signal paths, wherein data transmitted on the fifth differential signal path is scrambled with the first scrambler function and wherein data transmitted on the sixth differential signal path is scrambles with the third scrambler function.

14. The system as recited in claim 12 further comprising a receiver coupled to receive data transmitted on the plurality of signal paths, wherein the receiver is further configured to descramble data transmitted on the plurality of signal paths.

15. The system as recited in claim 14, wherein the first scrambler function is produce by implementing a first filter function, and wherein the second scrambler function is produced by applying a second filter function.

16. The system as recited in claim 15, wherein the receiver is configured to descramble data transmitted on the first differential signal path by applying a third filter function, wherein the third filter function is an inverse of the first filter function; and wherein the receiver is further configured to descramble data transmitted on the third differential signal path by applying a fourth filter function, wherein the fourth filter function is an inverse of the second filter function.

17. The system as recited in claim 16, wherein scrambling and descrambling are self-synchronizing.

18. The system as recited in claim 14, wherein scrambling data transmitted on the first differential signal path includes exclusive OR-ing the data with a first sequence, and wherein scrambling data transmitted on the third differential signal path includes exclusive OR-ing the data with a second sequence, wherein the second sequence is the logical inverse of the first sequence.

19. The system as recited in claim 18, wherein descrambling data transmitted on the first differential signal path includes exclusive OR-ing the data with the first sequence and wherein descrambling data transmitted on the second differential signal path includes exclusive OR-ing the data with the second sequence.

20. The system as recited in claim 19, wherein scrambling and descrambling of data is synchronized to a synchronization signal.

21. An electronic system comprising:
a plurality of differential signal paths, including first, second, and third differential signal paths, wherein the first differential signal path is adjacent to the second differential signal path, and wherein the second differential signal path is adjacent to the third differential signal path; and
a transmitter coupled to transmit data over the plurality of differential signal paths, wherein the transmitter includes circuitry configured to generate first and second scrambler functions, wherein data transmitted on the first and third differential signal paths are scrambled with a first scrambler function, and wherein data scrambled on the second differential signal path is scrambled with a second scrambler function, and wherein polarity of data transmitted on the third differential signal path is inverted prior to scrambling.

22. The electronic system as recited in claim 21, wherein the electronic system includes a fourth differential signal path, wherein data transmitted on the fourth differential signal path is scrambled with the second scrambler function, and wherein polarity of data transmitted on the fourth differential signal path is inverted prior to scrambling.

23. The electronic system as recited in claim 22, wherein the electronic system includes fifth and sixth differential signal paths, wherein data transmitted on the fifth differential signal path is scrambled using the first scrambler function and data transmitted on the sixth differential signal path is scrambled with the second scrambler function.

24. The electronic system as recited in claim 23, wherein the electronic system includes seventh and eighth differential signal paths, wherein data transmitted on the seventh differential signal path is scrambled using the first scrambler function and data transmitted on the eighth differential signal path is scrambled with the second scrambler function, and wherein data transmitted on each of the seventh and eighth differential signal paths is inverted prior to scrambling.

* * * * *